United States Patent [19]

Mitchell et al.

[11] 4,203,609
[45] May 20, 1980

[54] TRANSPORT VEHICLE

[75] Inventors: Terry L. Mitchell, Jenison; David A. Immink, Holland, both of Mich.

[73] Assignee: Herman Miller, Inc., Zeeland, Mich.

[21] Appl. No.: 929,737

[22] Filed: Jul. 31, 1978

[51] Int. Cl.² .................................................. B62B 7/04
[52] U.S. Cl. ........................ 280/47.11; 280/47.34; 280/79.1 R; 108/55.3
[58] Field of Search .............. 280/79.1, 47.34, 47.35, 280/87.01, 47.11; 108/901, 51.1, 55.3; 312/195

[56] References Cited

U.S. PATENT DOCUMENTS

| | | | |
|---|---|---|---|
| 2,191,184 | 2/1940 | Voorhies | 280/87.01 X |
| 2,448,427 | 8/1948 | Gordon | 280/79.1 X |
| 2,535,528 | 12/1950 | Brodbeck | 108/51.1 X |
| 3,424,472 | 1/1969 | Townsend | 280/47.11 |
| 3,664,465 | 5/1972 | Holland | 280/47.34 X |
| 3,719,157 | 3/1973 | Arcocha et al. | 108/901 X |
| 4,077,644 | 3/1978 | Roby et al. | 280/47.34 |

FOREIGN PATENT DOCUMENTS 1338331 11/1973 United Kingdom .................. 108/901

*Primary Examiner*—John J. Love
*Assistant Examiner*—D. W. Underwood
*Attorney, Agent, or Firm*—Price, Heneveld, Huizenga & Cooper

[57] ABSTRACT

A transport cart is disclosed having a load receiving and supporting platform of sandwich-type construction formed from a pair of spaced panels each having offset portions which contact the other panel. The panels, where they contact each other, are rigidly secured together to form a rigid, load supporting sandwich. The platform is mounted on swivel casters interconnected by a linkage system which responds to the pivotal movement of the tow bar and which effects opposite pivotal movement of the front and rear casters to cause the cart to track the towing vehicle.

10 Claims, 8 Drawing Figures

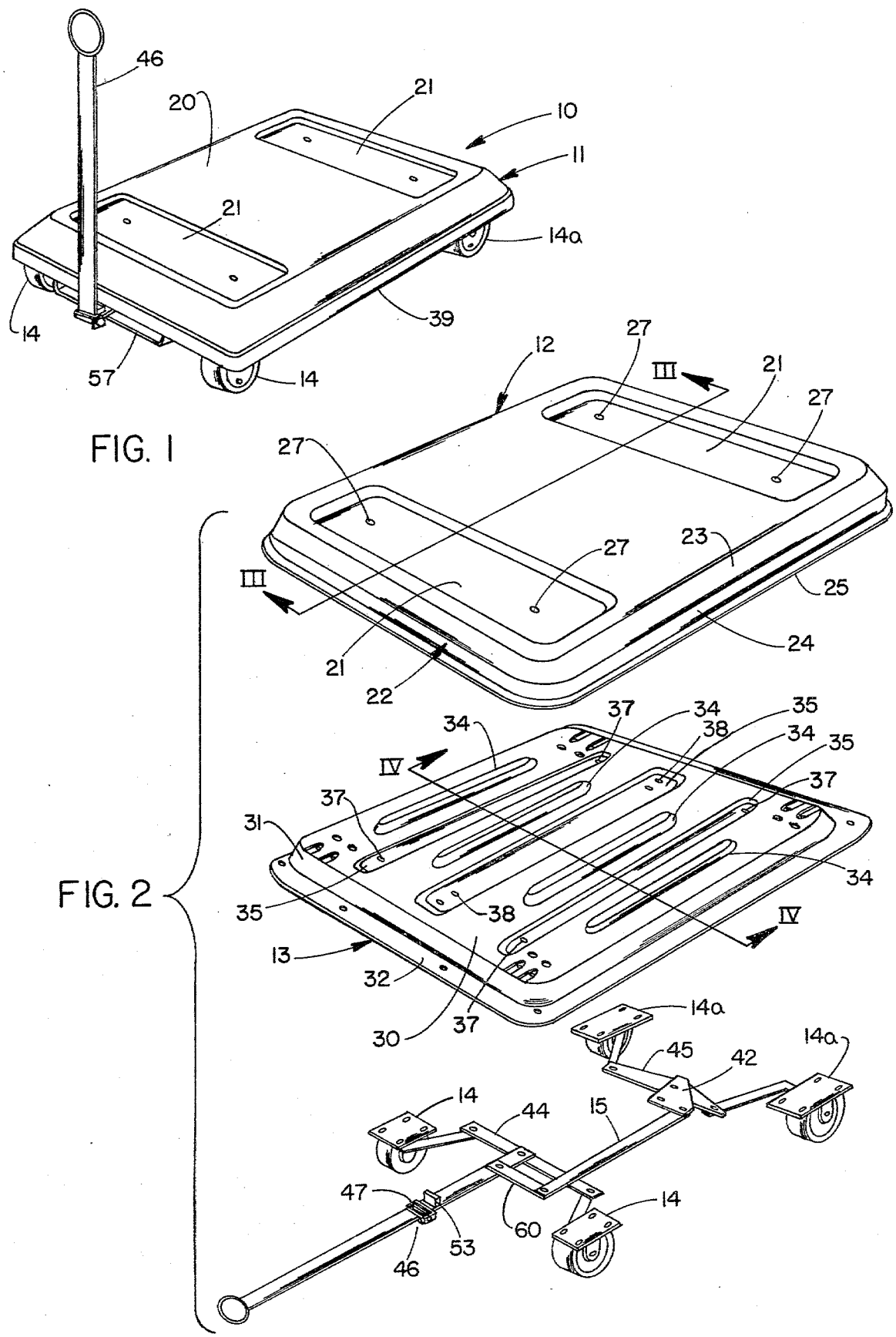

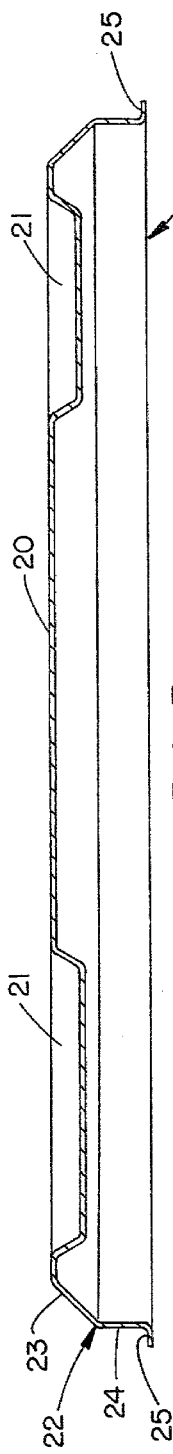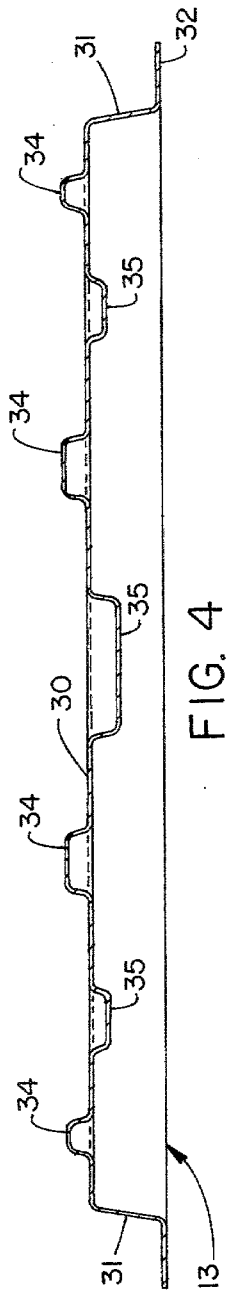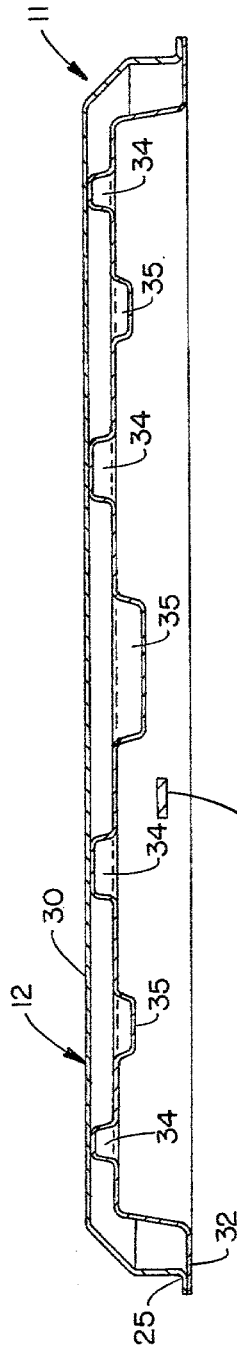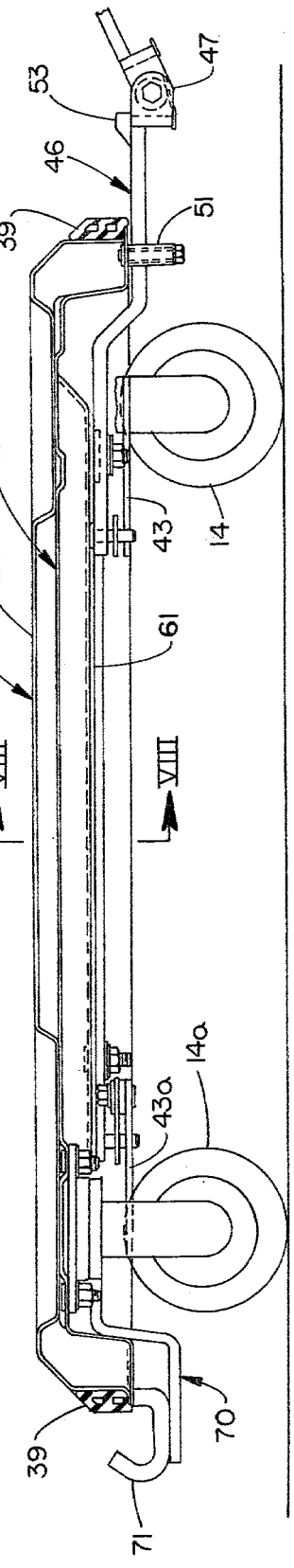
FIG. 3
FIG. 4
FIG. 8
FIG. 6

TRANSPORT VEHICLE

FIELD OF THE INVENTION

This invention is concerned with transport carts, particularly of the type used in industrial-commercial applications for movement of articles, preferably those loaded on pallets. The cart is particularly designed for use as a single transport vehicle or as one of a plurality of carts organized as a train and designed to accurately track and follow the propelling vehicle. Carts of this type must be capable of withstanding heavy loads and substantial abuse because of the operating environment for which they are designed. Vehicles of this type are used for transporting materials and articles in process throughout a plant or for movement of articles in a warehouse. In this connection, it is sometimes desirable that the carts be loaded on another vehicle or themselves placed in storage while fully loaded. It is sometimes necessary to move them from one level to another and this may be necessary even when the carts are loaded. For this purpose, it is important that the carts be capable of being lifted and moved by means such as a forklift truck. To withstand this type of use, the vehicles must be strong and should be so designed that there is no interference with the tines of such devices as a forklift truck. Further, it is desirable that they be of low silhouette so that they will not occupy valuable vertical space when used for storage purposes and will have a low center of gravity when used for transport. It is also important that the vehicles be so designed that they will accurately follow a towing vehicle, permitting one or more of the carts, when arranged in tandem, to navigate narrow aisles and to make turns from one aisle into another where the turning radius is very restricted.

A BRIEF DESCRIPTION OF THE INVENTION

The cart of the invention includes a platform mounted on swivel casters. The platform itself is a sandwich of two spaced panels with each panel having offset, rib-like or pan-like portions which position the main portions of the panels at a substantial spacing and provide areas where the panels are in contact with each other. At the areas of contact, the panels are rigidly joined as by welding to form a high-strength, rigid, unitary platform. The casters are recessed into this platform from beneath, whereby the platform is of low silhouette and thus has a minimum of ground clearance. The peripheral edges of the panels are bent downwardly to provide a rigid beam structure surrounding the platform to give it substantial strength and to provide a downwardly opening recess within which is mounted a linkage for controlling the swivel movement of the casters. Between the front and rear casters the interconnecting member of the linkage is recessed within the silhouette of the sides of the platform providing a clear area where the tines of a forklift may be inserted beneath the platform to lift it without interference with the caster-connecting linkage. The linkage is arranged in such a way that the cart will accurately track and precisely follow the towing vehicle ahead and thus can navigate corners of restricted radius.

The invention provides a platform having a smooth upper surface except for a pair of recessed wells which serve the dual function of strengthening and stiffening the platform and also permitting pallets of various sizes and leg configurations to be mounted on the platform. As constructed, the center of the platform provides a flat surface for receiving one or more flat bottom objects or pallets while the recesses permit the platform to receive one or more pallets having depending feet on their corners. Because the surface and sides of the platform are formed from a single sheet of material without joints, the platform provides a surface which resists collecting dirt and which may be readily washed and cleaned. This is particularly important when the carts are used in sensitive manufacturing processes such as precision electronics, pharmaceuticals, or the handling of dangerous chemicals.

BRIEF DESCRIPTION OF THE DRAWINGS

FIG. 1 is a perspective view of the transport cart of this invention;

FIG. 2 is an exploded, perspective view of the basic components of the cart;

FIG. 3 is a sectional, elevation view taken along the plane III—III of FIG. 2;

FIG. 4 is a sectional, elevation view taken along the plane IV—IV of FIG. 2;

FIG. 6 is a sectional, elevation view taken along the plane VI—VI of FIG. 5 omitting front caster for clarity;

FIG. 8 is a sectional, elevation view taken along the plane VIII—VIII of FIG. 6.

DESCRIPTION OF THE PREFERRED EMBODIMENT

Figure 7:
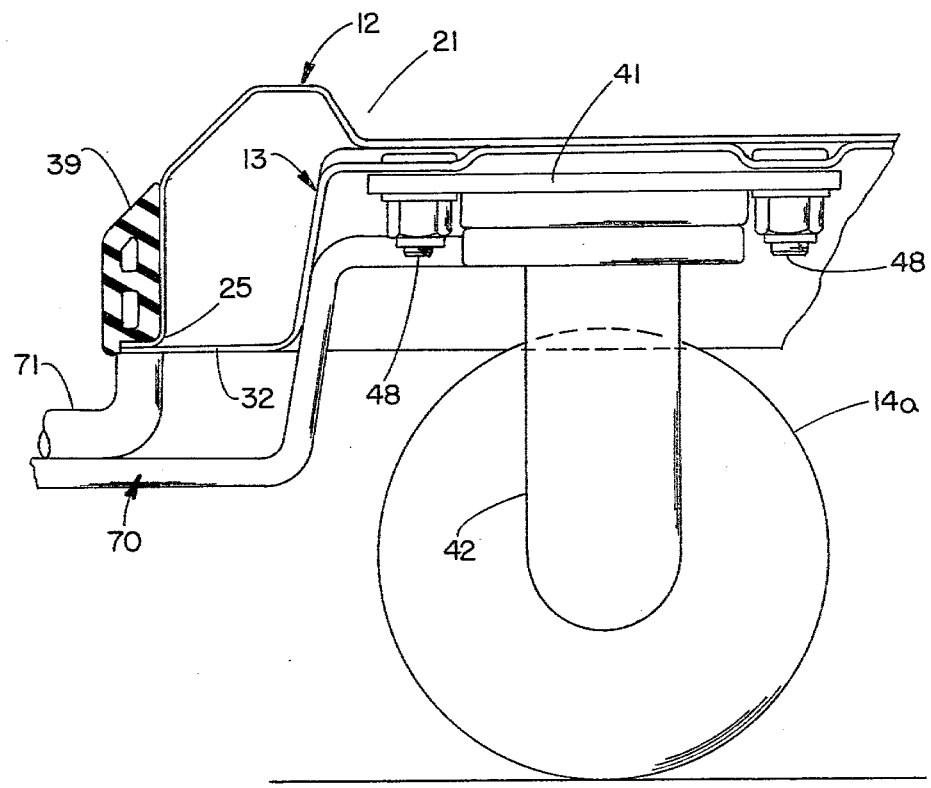
FIG. 7 is an enlarged, fragmentary view taken along the left-hand end of the plane VI—VI of FIG. 5.

Referring now to FIG. 1, the numeral 10 identifies the transport vehicle having a platform 11. As seen in FIGS. 2, 6 and 7, the platform 11 is, in effect, a sandwich made up of an upper panel 12 and a lower panel 13. The platform 11 is supported on four casters, two front casters 14 and two rear casters 14a. These casters are interconnected by a linkage 15.

The top panel 12 consists of a single sheet of material having a planar portion 20 and a pair of recessed wells 21. The panel has a depending flange 22 forming its periphery and extending entirely around the panel. The flange has an upper, outwardly inclined portion 23, a vertical portion 24 and a horizontally extending footpiece 25. The flange 22 provides a stiffening support for the panel 12 entirely surrounding the panel.

The two recessed wells 21 extend substantially the full width of the top of the panel and are recessed only a minor portion of the height of the side flanges 22. These recessed areas 21 are spaced apart and positioned adjacent the front and back of the panel and provide a receiving area for pallets of various sizes and having depending legs. They also serve the dual purpose of stiffening and reinforcing the panel 12.

The panel 13 also has a planar portion 30 surrounded by a depending flange 31 which has a horizontally extending footpiece 32 at its lower end. The size of the panel 13 is such that when the panel 13 is nested within the panel 12, the footpiece 25 of the panel 12 seats on the footpiece 32 of the panel 13 and the edges of the two footpieces are in the same vertical plane (FIGS. 6, 7 and 8). The panel 13 has a plurality of parallel, raised ridges 34 extending in a front-to-back direction. In addition, the panel 13 has a plurality of parallel depressed channels 35 also extending in a front-to-back direction. The tops of the ridges 34 and the bottoms of the channels 35 are flattened. Both the channels and the ridges are long, narrow structures which, in the case of the channels, extend substantially the full length of the lower panel 13. The ridges 34 are shorter and designed to seat between the front and back recessed wells 21 of the upper panel 12 when the two panels are sandwiched together. When the lower panel 31 is nested within the bottom of the upper panel 12, the tops of the ridges 34 seat against the undersurface of the planar area 20 of the upper panel and the bottoms of the recesses 21 seat against the upper surface of the planar portion 30 of the lower panel 13 (FIGS. 6 and 8). Where the panels are thus in contact, the panels are permanently and rigidly joined together. If the panels are fabricated from metal, such as steel, the panels are welded together in their areas of contact. If the panels are fabricated of a reinforced resin material, they will be bonded together at these points. In either case, the result is a sandwich structure in which the planar portions 20 and 30 of the panels are spaced apart the height of the ridges 34 and the recessed areas 21 to provide a very rigid, strong structure capable of standing high unit loading without deflection. The ridges 34 and channels 35 brace the platform against deflection in a lengthwise direction and the wells 21 brace the platform against transverse deflection.

The recessed wells 21 are each provided with a pair of holes 27 which permit water or other liquids to drain from the wells. This is particularly useful when the carts are scrubbed down to clean them. The holes 27 are aligned with the holes 37 in the lower panel so the liquids will pass entirely through the platform. Additional drain holes 38 are provided at each end of the central channel in the event any liquid accumulates in this area.

The peripheral flange of the cart is surrounded by bumper strip 39 of a suitable resilient material such as vinyl or rubber (FIG. 6). The strip 39 is secured by suitable means such as adhesive; is seated up and projects beyond the edge of the footpieces 25 and 32. It provides a cushion in the event of collision between the cart and an object to prevent, or at least lessen damage to either the cart or the object.

At each of the four corners of the lower panel, areas are provided to mount the casters 14 and 14a. This is best seen in FIG. 7. To mount each of the casters, depending weld-screws or studs 48 are welded to the lower panel to secure the mounting plates 41 of the casters. The lower surface of the lower panel in the four areas where the casters are mounted is substantially in the plane of the bottom surface of the wells 21 of the upper panel (FIG. 7). This is substantially above the bottom of the peripheral flanges of the platform for reasons which will be explained subsequently.

Figure 5:
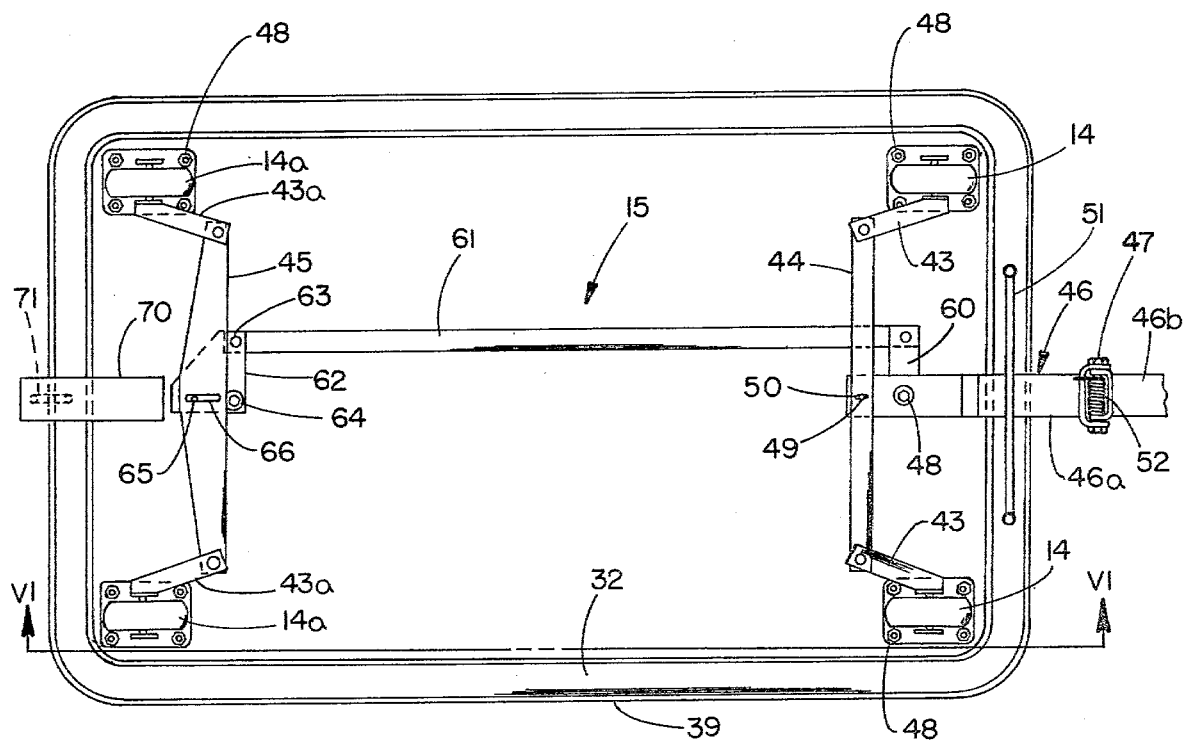
FIG. 5 is a bottom view of the transport cart of this invention omitting details of lower panel for clarity.

Each of the casters has a yoke 42 which is free to rotate about its vertical axis (FIG. 5). Each of the yokes is attached to a strap 43 which projects outwardly away from the pivot axis of the caster.

The straps 43 attached to the casters 14 at the front of the vehicle extend inwardly and rearwardly. The straps 43a attached to the casters at the rear of the vehicle extend inwardly and forwardly. The straps 43 for the forward casters, at their rearward, inner ends are connected by a cross link 44. The straps 43a for the rear casters at their forward ends are connected by a cross link 45. The cross link 44 is connected to the rearward end portion 46a of a tow bar 46. The tow bar also has a forward portion 46b connected to the rearward portion 46a by a hinge 47. The rearward portion 46b of the tow bar is positioned immediately beneath the bottom of the peripheral flange of the platform which forms the forward end of the platform and is pivotally connected to the platform by the stud 48 at a point substantially forward of the connection between it and the cross link 44. The connection between the tow bar and the cross link 44 is by means of the pin 49 which engages the cross link 44 by extending through the slotted opening 50. This provides a lost motion connection to accommodate the arcuate travel of the pin 49 as the tow bar is pivoted about the stud 48. The tow bar is also supported by the bracket 51. At the hinge 47, the forward end 46b of the tow bar is biased into an erected position by a spring 52, which normally holds the tow bar against the stop 53 (FIG. 6).

An arm 60 centered about the pivot stud 48 is rigidly secured to the rear portion 46b of the tow bar and projects to one side where it is pivotally connected at its outer or free end to the tie link 61. The rearward end of the tie link is pivotally connected to the pivot plate 62 at 63. The pivot plate, in turn, is pivotally secured to the platform by the pivot stud 64. The spacing between the pivot stud 64 and the point of pivotal connection between the tie link 61 and the pivot plate 62 is the same as the distance between pivot stud 48 and the pivotal connection between the end of the arm 60 and the tie link 61. The pivot plate 62 has a pin 65 which engages a slot 66 in the cross link 45. The spacing of the pin 65 from the pivot 64 is slightly greater than the spacing of the pin 49 from the pivot bolt 48. As the tow bar pivots to the left or the right, casters on the same side of the cart pivot through the same arc, about 18° on the outside of the turn and about 29.6° on the inside. This produces a turning radius for the cart of about 70 inches.

Because of the arrangement of the levers, when the tow bar is pivoted clockwise, as seen in FIG. 5, the casters 14 at the front end, will also be pivoted clockwise, whereas the casters 14a at the rear end of the platform will be pivoted counterclockwise. This results in the cart, in effect, rotating about its midpoint as it turns a corner. This is very important in enabling the cart to navigate sharp turns of limited radius, such as often occur in industrial and commercial facilities where one aisle joins another.

It will be noted from FIG. 6 that the tie link 61 is recessed up into the platform well above the lower edge of the peripheral flanges of the platform. Thus, it will not interfere with the tines of a forklift passing under the cart between the front and rear casters.

At the rearward end of the platform, a towing bracket 70 is secured to the platform and extends rearwardly out beyond the rear of the platform. This towing bracket is equipped with a hook 71 welded to its upper surface and designed to engage the loop at the forward end of the tow bar of the next following cart (FIG. 6).

The top panel, if fabricated from steel or aluminum, can be coated with suitable material such as vinyl to prevent rust and to facilitate cleanliness. When the panel is so coated, it can be easily cleaned as with a hose. The holes in the recessed wells 21 provide drains for this purpose.

Other linkage constructions for controlling the steering characteristics of the vehicle may be substituted for that specifically described in this invention, provided the mechanism interconnecting the front and rear wheel assemblies is sufficiently recessed within the vertical silhouette of the platform that it will not interfere with the lifting of the truck from beneath by means which seat against the platform between the front and rear wheels.

The sandwich construction for the cart provides a high-strength, deflection resistant panel of relatively thin construction, permitting it to have a low silhouette. This, coupled with the recessing of the casters and caster control mechanism, makes the truck particularly useful for both transport and storage. The construction also makes it versatile because it can safely and effectively handle pallets and other types of loads having a wide variety of designs and construction. It is also adapted to economical manufacture. The platform is particularly adapted to automated fabrication and even if not fully automated, involves a low labor factor for assembly. Being an integrated structure with only the tow bar and the towing bracket projecting, it is much less likely to be injured or to cause injury.

The rounded corners which are possible with the unitary construction involved also contribute to the elimination of injury to objects and personnel. Because both sides and the rear are free of obstructions, the cart can be loaded and unloaded from either side or the rear.

Having described a preferred embodiment of this invention, it will be recognized that various modifications of the invention may be made. Such of these modifications as do not depart from the principles of the invention are to be considered as included in the hereinafter appended claims, unless these claims, by their language, expressly state otherwise.

The embodiments of the invention in which an exclusive property or privilege is claimed are defined as follows.

1. A transport cart having a platform, said platform having upper and lower panels, said upper panel having a pair of recessed wells in its upper surface spaced apart lengthwise of said cart, said lower panel having elongated upstanding ridges alternating with depending channels; the height of said ridges being the same as the depth of said recessed wells in said upper panel, whereby said upper panel rests on said ridges and the bottoms of said recessed wells rest on said lower panel; said ridges and channels extending lengthwise of said cart with the ridges being of a length to be received between said recessed wells; said upper and lower panels each having a depending peripheral flange, the flange of said lower panel being nested within the flange of said upper panel; said panels being secured to each other to form said platform into a rigid sandwich; supporting wheels secured to said sandwich at each of the corners thereof.

2. A transport cart as described in claim 1 wherein said panels are of metal and are joined by welding.

3. A transport cart as described in claim 1 wherein said supporting wheels are swivel casters mounted to pivot about a vertical axis; a first link interconnecting the casters at one end of said platform for simultaneous pivotal movement in the same direction; a second link interconnecting the casters at the other end of said platform for simultaneous pivotal movement in the same direction, an actuator bar interconnecting said links for pivoting the casters connected to said first link oppositely from the casters connected to said second link;

said actuator bar being recessed within said lower panel to permit the tines of a lift truck to engage the lateral portions of the peripheral flanges of said platform for lifting said cart without damage to said actuator bar.

4. A transport cart as described in claim 3 wherein a resilient bumper encircles said platform.

5. A transport cart having a pair of spaced, generally parallel, rectangular panels rigidly joined together to form a sandwich, said panels each having a planar portion and a plurality of offset portions remote from the edges thereof; the offset portions of one panel being in contact with and securely attached to the planar portions of the other panel; each of said panels having a depending peripheral flange, each of said flanges terminating in an outwardly extending footpiece, the footpiece of the upper one of said panels seated on the footpiece of the lower one of said panels; an upwardly recessed pocket at each corner of said platform opening through the bottom thereof; a supporting wheel for pivotal movement about a vertical axis mounted in each of said pockets; linkage means interconnecting said wheels for simultaneous pivotal movement of said wheels with said draw bar; that portion of said linkage means extending between the casters at the front and those at the rear of said cart being recessed upwardly above the footpieces of the peripheral flange of said platform to permit a lifting device to be inserted under said cart and engage said footpieces between said front and rear wheels.

6. A transport cart as described in claim 5 wherein said offset portions of said upper panel form a pair of recessed wells in the upper face of said platform for receiving the legs of pallets, said recesses being at the front and back of said platform.

7. A transport cart as described in claim 1 wherein each of said panels is a single unitary sheet of material and said lower panel is entirely recessed within the bottom of said upper panel.

8. A transport cart as described in claim 5 wherein each of said panels is a single unitary sheet of material and said lower panel is entirely recessed within the bottom of said upper panel.

9. A transport cart as described in claim 1 wherein said recessed wells extending laterally of said upper panel substantially the full width of the panel and said ridges and channels in said lower panel extend lengthwise of said lower panel; said peripheral flanges extending below the bottoms of said channels.

10. A transport cart as described in claim 9 wherein said channels extend substantially the full length of said lower panel.

* * * * *